United States Patent
Degani et al.

(10) Patent No.: US 11,982,983 B2
(45) Date of Patent: May 14, 2024

(54) RADAR SYSTEMS AND DIAGNOSTIC METHODS THEREOF

(71) Applicant: Inxpect S.p.A., Brescia (IT)

(72) Inventors: Alessio Degani, Brescia (IT); Federico Papi, Brescia (IT); Filippo Parrini, Brescia (IT)

(73) Assignee: Inxpect S.p.A., Brescia (IT)

( * ) Notice: Subject to any disclaimer, the term of this patent is extended or adjusted under 35 U.S.C. 154(b) by 674 days.

(21) Appl. No.: 17/154,197

(22) Filed: Jan. 21, 2021

(65) Prior Publication Data
US 2021/0223752 A1 Jul. 22, 2021

(30) Foreign Application Priority Data
Jan. 21, 2020 (IT) .......................... 102020000001030

(51) Int. Cl.
*G05B 19/042* (2006.01)
*G01S 13/02* (2006.01)
(Continued)

(52) U.S. Cl.
CPC ........ *G05B 19/0425* (2013.01); *G01S 13/589* (2013.01); *G01S 13/755* (2013.01); *G01S 2013/0245* (2013.01)

(58) Field of Classification Search
CPC . G05B 19/0425; G01S 13/589; G01S 13/755; G01S 2013/0245
(Continued)

(56) References Cited

U.S. PATENT DOCUMENTS 4,737,790 A * 4/1988 Skeie ................. G06K 19/0675
342/51
4,746,830 A * 5/1988 Holland ................ G01S 13/755
333/195
(Continued)

FOREIGN PATENT DOCUMENTS

EP 1681578 A1 * 7/2006 ........... G01S 13/345
EP 1681578 A1 7/2006

OTHER PUBLICATIONS

Rehammar Robertetal.: "DesignofaSensorAgnosticFMCW-Compatible TransponderforAutomotiveApplications",2018IEEE ConfeenceonAntennaMeasurements&Applicaitons(CAMA), IEEE,Sep. 3, 2018(Sep. 3, 2018), pp 1-4,XP033444270, DOI:10.1109/CAMA.2018.8530595 (Year: 2018).*
(Continued)

*Primary Examiner* — Nuzhat Pervin
(74) *Attorney, Agent, or Firm* — MH2 TECHNOLOGY LAW GROUP LLP

(57) ABSTRACT

A radar system may include: a transceiver configured to transmit a first radar signal into a field of view and to receive a second radar signal from the field of view; a processing unit configured to process the second radar signal, to generate a detection track, given by a signal amplitude distribution as a function of distance from the transceiver, and to detect presence of targets in the field of view from the generated detection track; and a marker located in the field of view, wherein the marker is arranged in a fixed position relative to the transceiver and wherein the marker is configured to receive the first radar signal and to transmit a diagnostic radar signal toward the transceiver as a function of the first radar signal. The processing unit may be further configured to store a predetermined diagnostic track, including at least a characteristic distance and signal amplitude.

17 Claims, 3 Drawing Sheets

(51) Int. Cl.
*G01S 13/58* (2006.01)
*G01S 13/75* (2006.01)

(58) Field of Classification Search
USPC .......................................... 342/165
See application file for complete search history.

(56) References Cited

U.S. PATENT DOCUMENTS

| | | | | | |
|---|---|---|---|---|---|
| 5,945,942 | A | * | 8/1999 | Artis | G01S 7/4056 342/165 |
| 6,107,910 | A | * | 8/2000 | Nysen | G01S 13/755 340/10.3 |
| 6,369,772 | B1 | * | 4/2002 | Forster | G01S 13/767 343/850 |
| 6,400,311 | B1 | * | 6/2002 | Kolbli | G01S 7/4052 342/174 |
| 6,526,352 | B1 | * | 2/2003 | Breed | G01S 19/071 701/470 |
| 7,295,925 | B2 | * | 11/2007 | Breed | G01S 17/86 340/436 |
| 7,426,437 | B2 | * | 9/2008 | Breed | G01S 13/876 340/995.12 |
| 7,610,146 | B2 | * | 10/2009 | Breed | G01C 21/28 701/300 |
| 7,796,081 | B2 | * | 9/2010 | Breed | G01S 19/42 342/72 |
| 7,840,355 | B2 | * | 11/2010 | Breed | G08G 1/163 701/472 |
| 7,912,645 | B2 | * | 3/2011 | Breed | B60W 50/00 701/408 |
| 7,962,285 | B2 | * | 6/2011 | Breed | G01C 21/20 701/472 |
| 8,060,308 | B2 | * | 11/2011 | Breed | G05D 1/0246 340/870.07 |
| 8,892,271 | B2 | * | 11/2014 | Breed | G08G 1/161 701/2 |
| 9,103,671 | B1 | * | 8/2015 | Breed | G01S 13/865 |
| 10,013,878 | B2 | * | 7/2018 | Ricci | G06F 16/951 |
| 10,383,544 | B2 | * | 8/2019 | Fullerton | A61B 5/0507 |
| 10,816,655 | B2 | * | 10/2020 | Bharadwaj | G01S 7/4004 |
| 11,179,220 | B2 | * | 11/2021 | Chi Sing | A61B 5/0507 |
| 2007/0152804 | A1 | * | 7/2007 | Breed | G01S 17/86 701/301 |
| 2008/0015771 | A1 | * | 1/2008 | Breed | G05D 1/0274 340/461 |
| 2008/0040023 | A1 | * | 2/2008 | Breed | G08G 1/166 701/472 |
| 2008/0040029 | A1 | * | 2/2008 | Breed | B60W 50/00 701/514 |
| 2008/0140318 | A1 | * | 6/2008 | Breed | B60N 2/2863 702/3 |
| 2008/0147253 | A1 | * | 6/2008 | Breed | G01C 21/3697 701/3 |
| 2008/0150786 | A1 | * | 6/2008 | Breed | B60W 30/18154 342/53 |
| 2008/0154495 | A1 | * | 6/2008 | Breed | G01C 21/20 701/472 |
| 2008/0154629 | A1 | * | 6/2008 | Breed | G08G 1/165 701/70 |
| 2008/0165018 | A1 | * | 7/2008 | Breed | G08G 1/161 340/463 |
| 2008/0167819 | A1 | * | 7/2008 | Breed | G08G 1/161 701/300 |
| 2008/0215202 | A1 | * | 9/2008 | Breed | G01C 21/3694 701/472 |
| 2008/0215231 | A1 | * | 9/2008 | Breed | G08G 1/161 382/104 |
| 2009/0030605 | A1 | * | 1/2009 | Breed | G01S 17/86 340/901 |
| 2009/0043506 | A1 | * | 2/2009 | Breed | G08G 1/161 701/472 |
| 2009/0140887 | A1 | * | 6/2009 | Breed | G01C 21/1656 701/116 |
| 2010/0220772 | A1 | * | 9/2010 | Edmonson | H03H 9/6406 375/240 |
| 2012/0209505 | A1 | * | 8/2012 | Breed | G01C 21/3697 701/408 |
| 2012/0264376 | A1 | * | 10/2012 | Breed | G08G 1/161 455/66.1 |
| 2012/0323474 | A1 | * | 12/2012 | Breed | B60W 50/00 701/117 |
| 2015/0197248 | A1 | * | 7/2015 | Breed | G08G 1/096775 340/905 |
| 2017/0115378 | A1 | * | 4/2017 | Haghighi | G01S 7/4052 |
| 2017/0307732 | A1 | * | 10/2017 | Haghighi | G01S 7/4056 |
| 2018/0306904 | A1 | * | 10/2018 | Vacanti | G01S 7/4056 |
| 2019/0141467 | A1 | * | 5/2019 | Breed | G08G 1/161 |
| 2019/0204414 | A1 | * | 7/2019 | Steinmetz | G01S 7/40 |
| 2020/0070859 | A1 | * | 3/2020 | Green | B61L 25/025 |
| 2021/0004985 | A1 | * | 1/2021 | Lee | G05D 1/0088 |

OTHER PUBLICATIONS

Rehammar et al., "Design of a Sensor Agnostic FMCW-Compatible Transponder for Automotive Applications", 2018 IEEE Conference on Antenna Measurements & Applications (CAMA), IEEE, Sep. 3, 2018, 4 pages.

Italian Search Report and Written Opinion in corresponding Italian Application No. 102020000001030 dated Oct. 8, 2020, 8 pages.

* cited by examiner

RADAR SYSTEMS AND DIAGNOSTIC METHODS THEREOF

CROSS-REFERENCE TO RELATED APPLICATION(S)

This application claims priority under 35 U.S.C. § 119 from Italian Patent Application No. 102020000001030, filed on Jan. 21, 2020, in the Italian Patent and Trademark Office ("IPTO"), the entire contents of which are incorporated herein by reference.

Field of the Invention

The present invention relates to the field of radar detection. In particular, the invention relates to a radar system with self-diagnostic functions and a method for malfunction diagnostics in a radar system.

Background Art

Radar detection allows targets to be detected in an environment to be monitored, by transmitting, receiving and processing radar signals in the environment, and is therefore used for various applications including detection of intruders in private areas and personnel safety in working environments with hazardous areas.

In certain applications, radar plays a critical role, so a high level of reliability is required. For example, if a person enters an industrial area in which dangerous machinery is operating, the radar can be assigned the task to shut down the machinery. So, a radar malfunction may cause the machinery to remain in operation, leading to significant hazard for the person who has entered the area.

Timely diagnosis of any kind of radar malfunction is therefore desirable, in view of restoring proper operation or taking any other measure before occurrence of the situation in which radar operation is required.

A few diagnostic or self-diagnostic methods for radar systems are already known, which can check proper operation of individual parts of the system.

EP 1681578 describes an example of radar transponder. It receives signals from a fixed radar, and retransmits thereto response signals. In this particular transponder a phase control is performed to reduce signal leakage between the transmission and reception channels. Nevertheless, the transponder is not in any manner related to self-diagnostic functions of the fixed radar.

A similar example of a radar transponder is described in the paper "Design of a Sensor Agnostic FMCW-Compatible Transponder for Automotive Applications" (Rehammar et al., 2018 IEEE conference on antenna measurements & applications (CAMA), Mar. 3, 2018, pages 1-4).

Problem of the Prior Art

Diagnostics of individual parts of a radar requires a large number of separate checks, depending on radar architecture, and in any case, it cannot exclude with reasonable certainty that some unexpected malfunction in some part will not be detected by the checks.

SUMMARY OF THE INVENTION

The main object of the present invention is to obviate the above discussed drawbacks of the prior art, and in particular to provide general diagnostic of a radar system that will not miss any kind of malfunction, even those that are difficult to predict during design.

This and other objects are fulfilled by a radar detection system and a radar system diagnostic method as defined in any of the accompanying claims.

In particular the invention includes placing a marker in the field of view of the radar. As the marker is impinged upon by the signal transmitted in the environment, it retransmits a specific diagnostic radar signal, as a function of the one it has received, back to the radar transceiver. As the signal received by the transceiver is being processed, a check may be made to assess whether the diagnostic radar signal is present, mixed with the rest of the radar signal, that comes from the environment and is used for target recognition.

A predetermined diagnostic track related to the diagnostic radar signal is stored beforehand. Therefore, while processing the signal collected by the transceiver, a radar system malfunction is indicated if the track expected to be left by the diagnostic radar signal cannot be found.

Advantageously, any kind of malfunction upstream from the signal transmission, during transmission and reception of the signal, or during later conditioning of the collected signal, will cause a mismatch between the diagnostic signal and the diagnostic track, and will be indicated.

Although no information is provided about the specific malfunctioning part, this method is therefore very effective in recognizing malfunctions of different types. In fact, the search for the diagnostic track from processing of the second radar signal substantially uses the same process that is used to detect the targets.

More in detail, in normal processing of the collected signal, a detection track is generated, such as a signal spectrum, and the analysis of the detection track allows target identification using known techniques. Then, the diagnostic track of the invention is searched for in the same detection track, like the targets. Therefore, the diagnostic signal is recognized as a target with particular characteristics that must match the diagnostic track.

Therefore, it will be highly unlikely to find fault conditions in which target detection is not possible, but a correct diagnostic track is found in the detection track, or vice versa, correct operating conditions in which the diagnostic signal does not generate a diagnostic track that can be found as expected.

Conversely, the prior art transponders does not provide any check on whether the detection track contains portions having amplitude and distance that are compatible with a fixed marker, that is always in the same characteristic position. Moreover, the do not infer any conclusion about malfunctions of the radar which are based on suck a check.

In the preferred embodiment, the marker comprises a marker antenna that receives the signal spread from the transceiver, converts it into an electrical signal on a transmission line that causes reflection thereof, and retransmits the electrical signal that has been reflected. Since most radars determine the distance of a target based on the time delay between transmission and reception of the signal, the diagnostic radar signal is interpreted as a target in a predetermined position, also characterized by a known signal amplitude.

The calculated position may correspond to the actual position of the marker, or the diagnostic radar signal may be interpreted as a dummy target located at a distance from the transceiver that is greater than the physical distance from the marker, due to the time taken by the electrical signal in the marker to propagate on the line, be reflected and retransmitted. This effect can be used during design to select the best position in which the dummy target will be found, by acting on the characteristics of the electrical signal propagation line to change the time delay in reflection and retransmission.

It should be noted that these effects can be obtained with a marker consisting of a simple passive device, which is thus highly reliable.

Preferably, a switch is also present in the marker, to activate and deactivate retransmission of the diagnostic radar signal, or to cause transmission of diagnostic radar signals with different characteristics, e.g. by directing the electrical signal to impedances that would completely absorb it, without reflecting it, or would reflect it with different time delays, phases and/or amplitudes.

With an appropriate synchronization with the remaining parts of the radar system, this allows use of diagnostic tracks varying with different detection cycles, according to predetermined repetition schemes, which are easily distinguishable from the remaining signal portions which must in any case be analyzed for target identification. In addition, the presence of the diagnostic radar signal may be limited to those detection cycles in which the diagnostic function is to be performed, without disturbing target detection in the other cycles.

Further characteristics and advantages of the invention will be recognizable by a skilled person from the following detailed description of a few exemplary embodiments.

BRIEF DESCRIPTION OF FIGURES

Some embodiments of the invention are schematically shown the accompanying drawings, in which.

DETAILED DESCRIPTION

Figure 1:
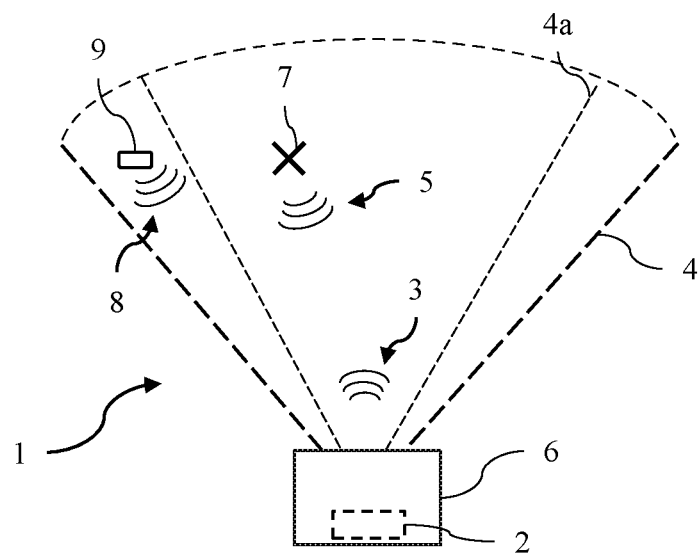
FIGS. 1, 2 and 3 schematically show three alternative radar systems of the invention, in which a marker is provided for diagnostic purposes in three different positions, FIGS. 4-9 schematically show various embodiments of a marker that can be used in the system of the invention.

A radar system 1 comprises a transceiver 2, configured, as is known in the art, to cyclically transmit a first radar signal 3 into a field of view 4 and to cyclically receive a second radar signal 5 from the field of view 4. For example, the transceiver 2 may comprise one or more transceiver antennas, and each of the transceiver antennas may be configured to transmit the first radar signal 3 only, to receive the second radar signal 5 only, or both.

The radar system 1 further comprises a casing 6 which contains the transceiver 2, and optionally additional components, some of which will be specified below.

The radar system 1 further comprises a processing unit (not shown) in signal communication with the transceiver 2, which can be housed in the casing 6. The processing unit is configured to process the second radar signal 5, so as to cyclically generate a detection track and detect the presence of targets 7 in the field of view 4 from the detection track.

This processing is known per se and depends on the characteristics with which the first radar signal 3 is generated and transmitted. Generally, processing involves establishing a predetermined correspondence between time delays, occurring between the transmission of the first radar signal 3 and the reception of portions of the second radar signal 5, and origin distances of the portions of the second radar signal 5 from the transceiver 2.

Thus, when the first radar signal 3 impinges upon a target 7 in the field of view, it is reflected thereby, with the generation of a portion of the second radar signal 5 that reaches back to the transceiver 2 with a respective time delay. Therefore, the second radar signal 5 comprises portions originating from reflections from different targets 7, in addition to inevitable noise portions. The following description will illustrate that the second radar signal 5 of the invention will also include a portion consisting of a diagnostic radar signal 8.

Clearly, the predetermined correspondence is connected to the time-of-flight of the first and second radar signals 5, and therefore their propagation speed. Nevertheless, the step of establishing the correspondence between time delays and distance of the targets 7 shall not be understood to necessarily include calculating the time delay in a specific step, but can be implicitly established by calculations from other data that directly provide the distance of the second radar signal 5 detected by the transceiver 2.

For example, according to the Frequency Modulated Continuous Wave (FMCW) technique, the first radar signal 3 is generated with a varying frequency with increasing and/or decreasing linear ramps. Therefore, this frequency pattern is also reproduced by the portions of the second radar signal 5 generated by reflections. Here, the time delay results in a constant frequency difference between the first radar signal 3 and the portion of the second radar signal 5 being analyzed.

Then, Fourier analysis, applied to a baseband signal with a frequency given by the difference between first and second radar signals 5, allows to detect the frequencies in which significant signal portions are present, and infer the distances of the targets 7. Here, the detection track is given by the distribution of signal amplitudes as a function of frequency or as a function of distance, both quantities being related to the time of flight of the signal. This is considered an example of a correspondence established between time delay and distance.

In general, in addition to distances, the processing unit may be configured to also determine further positional parameters of the targets 7, such as azimuth and elevation angles, according to known techniques, not described herein. Moreover, the processing unit may be configured to determine the speeds of the targets 7, preferably by measuring frequency doppler components of the various signal portions, or by plotting the different positions of the target 7 in a series of detection cycles.

Figure 2:
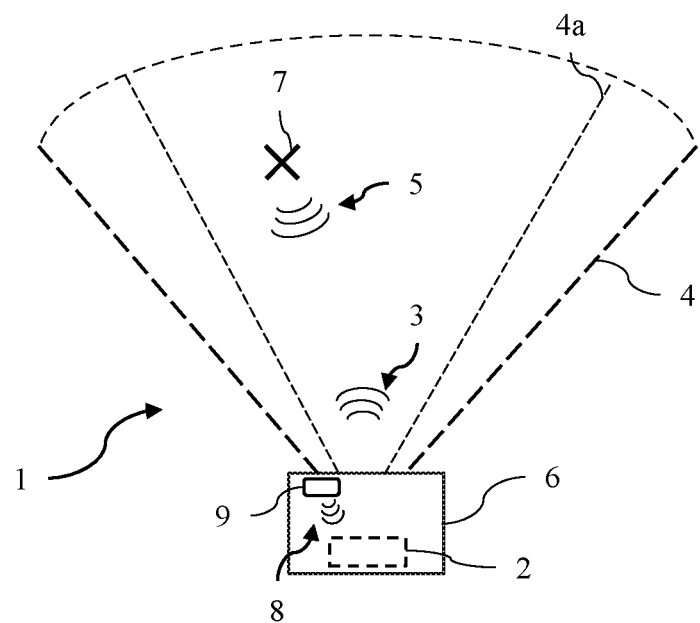
Figure 3:
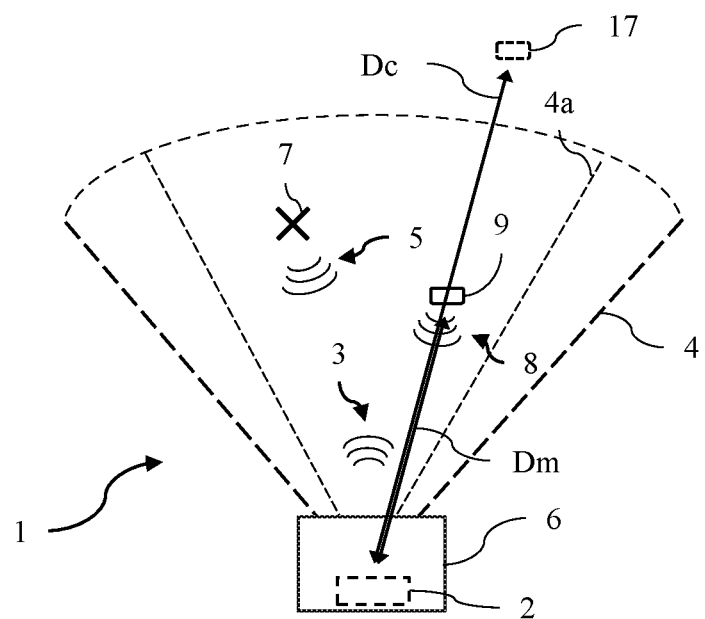

In this context, the radar system 1 of the invention comprises a marker 9 located in the field of view 4 of the transceiver 2, which has the purpose to carry out diagnostic tasks. In certain embodiments, the marker 9 is placed inside the casing 6, as shown in FIG. 2. In other embodiments, the marker 9 is placed outside the casing 6 and is spaced from the casing 6, as shown in FIGS. 1 and 3. In either case, the distance of the marker 9 from the transceiver 2 will be referred to as marker distance Dm.

The marker 9 occupies a fixed position. For example, it can be directly fixed to the transceiver 2 (or to the casing 6 thereof). Otherwise, the marker 9 can be fixed to a support that occupies a fixed position in the field of view 4. An exemplary fixed support can be a wall of the environment.

It should be noted that the field of view 4 may contain a monitored region 4a of higher interest than the other regions of the field of view 4. For example, the monitored region 4a may correspond to the region of the field of view 4 adjacent to dangerous machinery, which does not occupy the entire field of view 4. Therefore, the processing unit may be configured, for example, to report detected targets 7 in the monitored region 4a but not to report detected targets 7 outside the monitored region 4a.

The marker 9 may have a disturbing effect on normal target detection 7. Therefore, if monitored regions 4a of high interest are provided, the marker 9 will preferably, but not necessarily, be outside the monitored region 4a, as best shown in FIG. 1, also based on which embodiment will be implemented among those discussed below, as some of them have higher or lower disturbance levels.

The marker 9 is configured to receive the first radar signal 3 and to transmit a diagnostic radar signal 9 toward the transceiver 2 as a function of the first radar signal 3. This operation may be carried out at each detection cycle, or preferably only in a first plurality of cycles. Conversely, in a second plurality of cycles, the marker 9 may be configured to transmit no diagnostic radar signal 8. Preferably, normal detection of targets 7 is carried out both in the first plurality of cycles, parallel to processing connected to the diagnostic radar signal as described below, and during the second plurality of cycles. However, embodiments are also possible in which the first plurality of cycles is only dedicated to diagnostics while normal target detection is limited to the second plurality of cycles.

Also alternatively, the marker 9 may be configured to transmit a first diagnostic radar signal 8a in a first plurality of cycles, and a second diagnostic radar signal 8b different from first diagnostic radar signal 8a in a second plurality of cycles, for example as described below. Preferably, the transmission of different diagnostic radar signals 8a, 8b by the marker 9 follows in any case the reception by the marker 9 of the same first radar signal 3, and it is an internal configuration of the marker 9 that conditions the signal in different ways during different cycles. Nevertheless, the processing unit may be also configured to generate the first radar signal 3 with different characteristics during the first and second pluralities of cycles.

Figure 7:
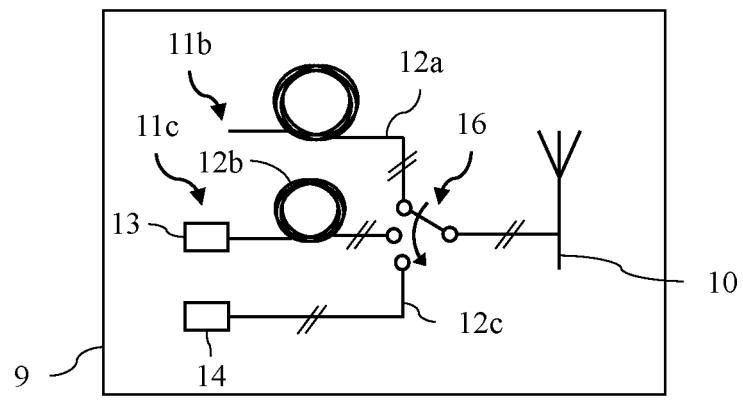

These different behavior options for the marker 9 in different cycles may also be combined together, leading for example to a first plurality of cycles in which a first diagnostic radar signal 8a is transmitted, a second plurality of cycles in which a second diagnostic radar signal 8b is transmitted, and a third plurality of cycles in which no diagnostic radar signal 8 is transmitted. One embodiment of a marker 9 for this mode is shown in FIG. 7. Here, the terms first, second and third should not be considered as being associated with a specific order but are only used to distinguish pluralities of cycles in which the general behavior of the system 1 changes.

In these cases a synchronization between the marker 9 and the processing unit is preferable. For example, they may be in signal communication with each other and the processing unit may be configured to activate a diagnostic mode, during each plurality of cycles in which at least one diagnostic radar signal 8 is transmitted, and to deactivate the diagnostic mode during the plurality of cycles in which no diagnostic radar signal 8 is transmitted. Therefore, the processing unit may instruct the marker 9 to start the first and/or second and/or third pluralities of cycles.

Alternatively, the alternation of the different pluralities of cycles may be managed by a master unit in signal communication with the marker 9 and the processing unit, or in less advantageous embodiments by an operator who manually instructs the two devices to activate the desired mode. It should be observed in any case that the term processing unit shall not be understood to be restricted to embodiments in which processing is carried out by a single physical device, but different functions of the processing unit may be carried out by separate hardware elements.

In one embodiment in which different diagnostic radar signals 8 are transmitted, the cycles in which the marker 9 transmits different diagnostic radar signals 8 are in an alternating succession, i.e. consecutive cycles will not transmit the same diagnostic radar signal 8, whereas the first diagnostic radar signal 8 may be transmitted in one cycle with the second, different, diagnostic radar signal 8 being transmitted in the next cycle. As an alternative to the alternating succession, the same diagnostic radar signal 8 is repeatedly transmitted, before moving to a different diagnostic radar signal 8, in a number of preferably less than 10 consecutive cycles, more preferably less than 5 consecutive cycles. This means that the transmission of the first diagnostic signal 8 and the second diagnostic signal 8 by the marker 9 have a similar duration time, preferably the same duration.

In a further embodiment, in which it is possible to transmit no diagnostic radar signal 8 by the marker 9 in certain cycles, the plurality of cycles in which the diagnostic mode remains active will preferably include a predetermined number of consecutive diagnostic cycles (possibly including cycles in which different diagnostic radar signals are transmitted), followed by a plurality of consecutive cycles in which the diagnostic mode is deactivated, in a predetermined number of non-diagnostic cycles. The duration of each sequence of diagnostic cycles, for example 10 ms, is preferably less than the duration of each sequence of non-diagnostic cycles, for example 10 s. Therefore, the predetermined number of non-diagnostic cycles is greater than the predetermined number of diagnostic cycles, preferably at least 10 times, and even more preferably at least 100 times as much. Nevertheless, embodiments are also possible in which the diagnostic mode is always active, or in any case is active for a time similar to the time of the non-diagnostic mode.

Periodic activation of the diagnostic mode allows the marker 9 to be compatible with positioning even within monitored areas 4a of high interest of the field of view 4.

In order to generate the introduced diagnostic radar signals 8, in the preferred embodiment the marker 9 comprises a marker antenna 10 and at least one reflection element 11. Furthermore, the marker 9 comprises an electrical connection 12, such as a cable or another type of electrical transmission line, between the marker antenna 10 and the reflection element 11. For purposes that will be explained in greater detail below, the marker 9 may also comprise a plurality of marker antennas 10a, 10b. However, unless otherwise indicated, reference will be made mainly to the case of a single marker antenna 10.

The marker antenna 10 is configured to receive the first radar signal 3 and convert it into a first electric signal within the marker 9, namely in the electrical connection 12.

The reflection element 11 is configured to reflect the first electrical signal and so generate a second electrical signal inside the marker 9, still in the electrical connection 12. The reflection element 11 may comprise, for example, a short circuit 11a between different conductors of the electrical connection 12, or an open circuit (not shown) given by the termination without connections of the conductors of the electrical connection 12.

This is because electromagnetic waves, propagating in an electric line up to its end, are generally reflected with intensities, phases and dampings depending on the impedance encountered at the end of the line, as well as on physical parameters of the line itself such as material and length. Hence, the short circuit 11a and the open circuit are very simple exemplary embodiments of impedance values that allow reflection of the first electrical signal and consequent generation of the second electrical signal.

Figure 4:
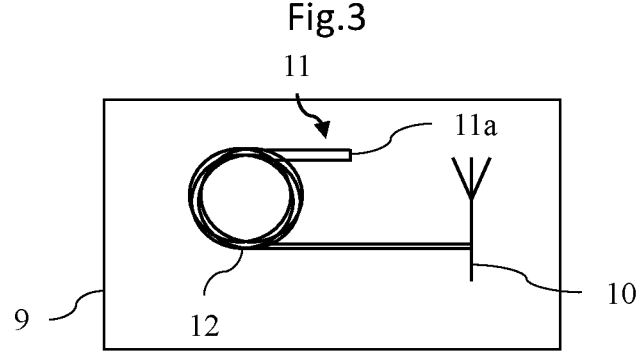

FIG. 4 shows an embodiment of a marker 9 in which there is a single reflection element 11, represented by a short circuit 11a. A two-wire diagram has been used in this figure, and the electrical connection 12 shows windings of a cable representing the length of the electrical connection 12. In fact, as explained below for some embodiments, benefits may be obtained from providing an electrical connection 12 with a predetermined length, for example by introducing wound cable portions between the marker antenna 10 and the reflection element 11. Nevertheless, the electrical connection 12 does not necessarily need to have line portions specially introduced to lengthen the electrical connection 12, with respect to the minimum length required to connect the marker antenna 10 to the reflection element 11.

As an alternative to short circuits 11a or open circuits, an electric reflection impedance may be provided between the conductors of the electrical connection 12, i.e. an impedance whose value is adapted to allow reflection of the first electrical signal and the generation of the second electrical signal. A skilled person will be already aware of the specific impedance values that maximize or minimize (possibly to zero) reflection.

On the other hand, the term electric absorption impedance 14 will be used hereinbelow to designate an optional impedance between conductors of an electrical connection 12, whose value is chosen so that the impedance is configured to receive the first electrical signal without reflecting any second electrical signal, i.e. to absorb the first electrical signal. The usefulness of this optional electric absorption impedance 14 will be explained below.

Additional examples of markers 9 having multiple reflection elements 11, represented by electric reflection impedances 13, electric absorption impedances 14, or electrical connections 12 terminated with a short circuit 11a or an open circuit, are shown in FIGS. 5-9, in a single-wire diagram. When no reflection impedance 13 or absorption impedance 14 is shown, the electrical connection 12 is intended to be terminated with an open circuit or a short circuit 11a.

After reflection, the marker antenna 10 is configured to transmit the diagnostic radar signal 9 by converting the second electrical signal into a radar signal. Due to the time taken for propagation of the first and second electrical signals in the electrical connection 12, the marker 9 is configured to transmit the diagnostic radar signal 8 with a certain marker time delay, starting from reception of the first radar signal 3.

It should be noted that, advantageously, in this embodiment the marker 9 may be a simple passive device, which requires no power supply. A power supply may nevertheless be provided when it is located particularly far from the transceiver 2 if the reflected signal requires amplification to be distinguished from the noise portions of the second radar signal 5 by the processing unit.

Figure 5:
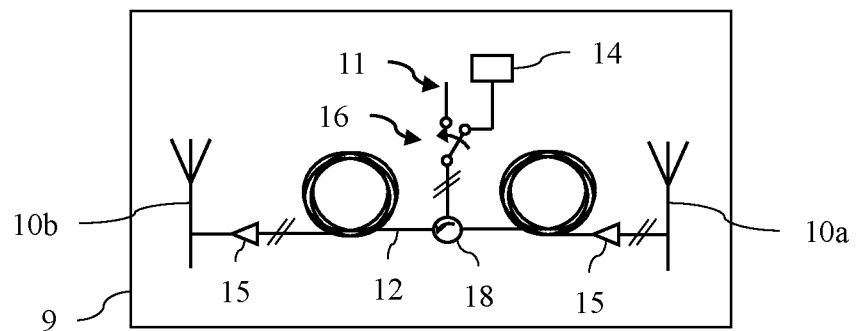

In this case, as shown in FIG. 5, the marker 9 comprises a first marker antenna 10a, configured to receive the first radar signal 3, and a second marker antenna 10b, configured to transmit the diagnostic radar signal 8 by converting the second electrical signal. Furthermore, the marker 9 may comprise one or more electrical signal amplifiers 15 configured to amplify the first electrical signal that comes from the first marker antenna 10a and is directed to the reflection element 11 and/or to amplify the second electrical signal that comes from the reflection element 11 and is directed to the second marker antenna 10b.

These amplifiers 15, known to the skilled person, are oriented, so that any electrical signal propagating opposite to the amplification path would be attenuated.

In addition, in the embodiment of FIG. 5, the marker 9 comprises a routing component 18 located in the electrical connection 12 and configured to prevent the first electrical signal from being directly transmitted from the first marker antenna 10a to the second marker antenna 10b and bypass the reflection element 11.

More in detail, the routing component 18 comprises at least a first, a second and a third electrical ports, which are electrically connected to the first marker antenna 10a, the reflection element 11 and the second marker antenna 10b, respectively. The routing component 18 is configured to route the signal from the first port to the second port, and to route the signal from the second port to the to the third port, while preventing the signal from the first port from being transmitted to the third port and preventing the signal from the second port from being transmitted to the first port.

The routing component 18 is known per se to the skilled person, and may be implemented, for example, as a directional coupler, a circulator, or a splitter.

In embodiments where cycles are provided in which the diagnostic radar signal 8 is not to be transmitted, the marker 9 preferably comprises a switch 16 configured to connect and disconnect the marker antenna 10 to/from the reflection element 11, during the first and second pluralities of cycles, respectively. Reference is made here and below to the case in which the first plurality of cycles is that in which the marker 9 transmits the diagnostic radar signal 8, and the second plurality is that in which the diagnostic radar signal 8 is not transmitted. If a third plurality of cycles is provided, the numerical adjectives may be modified as obvious for greater consistency.

The marker 9 also comprises an electric absorption impedance 14, and the switch 16 is configured to disconnect and connect the marker antenna 10 to the absorption impedance 14, during the first and second pluralities of cycles, respectively.

Figure 6:
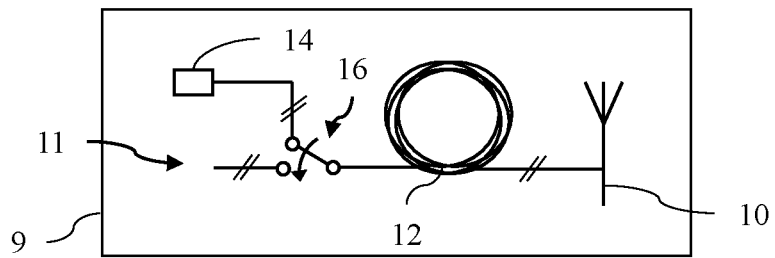

It shall be noted that the switch 16 is preferably connected to a portion of the electrical connection 12 distal from the marker antenna 10, as shown in FIG. 6 where the reflection element 11 is represented by a short circuit 11a or an open circuit. In this case, the reflection element 11 and the absorption impedance 14 can be selectively connected to the same electrical connection 12, at its distal portion.

Alternatively, as shown in FIG. 7, two distinct electrical connections 12a, 12b may be provided (which may be referred to as first and second electrical connections 12a, 12b, or with different numerical adjectives according to the embodiments), which connect the marker antenna 10 to the reflection element 11 and the absorption impedance 14, respectively. In this case, the switch 16 may be placed between the marker antenna 10 and the distinct electrical connections 12a, 12b. FIG. 7 namely shows three electrical connections 12a, 12b, 12c with different lengths leading to two distinct reflection elements 11a, 11b and to an absorption impedance 14, to combine the advantages already described for the absorption impedance 14, with the advantages of different reflection elements 11a, 11b and of different lengths for the electrical connections 12a, 12b, 12c that will be explained below.

Thus, in embodiments where cycles are provided for transmissions of distinct diagnostic radar signals, the marker 9 comprises not only one reflection element 11, but a first reflection element 11b and a second reflection element 11c, both configured to reflect the first electrical signal, and to generate two distinct second electrical signals inside the marker 9.

In addition, the marker 9 comprises a switch 16 similar to that described above, which is configured to connect and disconnect the marker antenna 10 to/from the first reflection element 11b, during the first and second pluralities of cycles, respectively. The switch 16 is further configured to disconnect and connect the marker antenna 10 to/from the second reflection element 11c, during the first and second pluralities of cycles, respectively.

Reference is made here and below to the case in which the first plurality of cycles is that in which the marker 9 transmits the first diagnostic radar signal 8, and the second plurality is that in which the marker 9 transmits the second diagnostic radar signal 8. If a third plurality of cycles is provided, the numerical adjectives may be modified as obvious for greater consistency.

Figure 8:
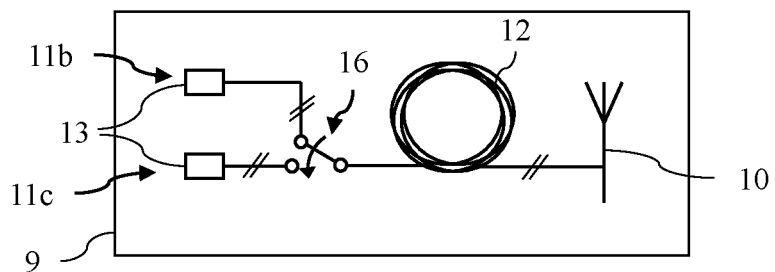

In one embodiment, as shown in FIG. 8, the first reflection element 11b and the second reflection element 11c are two different electric reflection impedances 13, which can be selectively connected to the same electrical connection 12, at its distal portion, via the switch 16. The different electric reflection impedances 13 can generate the second electrical signal, and thus the diagnostic radar signal 8, with different amplitudes and/or phases in the different cycles in which they are connected to the marker antenna 10.

Figure 9:
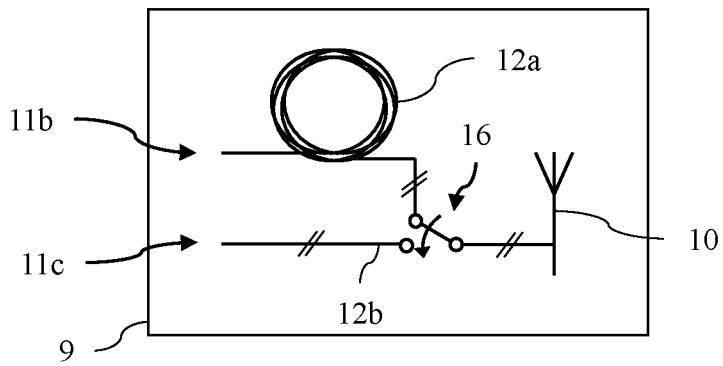

According to another embodiment of the marker 9, as shown in FIG. 9, which is adapted too to the transmission of different diagnostic signals in different cycles, the marker 9 comprises a first electrical connection 12a between the marker antenna 10 and the first reflection element 11b, and a second electrical connection 12b between the marker antenna 10 and the second reflection element 11c. Thus, the switch 16 may be placed between the marker antenna 10 and the two electrical connections 12a, 12b.

Preferably, the first and second connections 12a, 12b have different physical characteristics 12a, 12b, and in particular different lengths. However, the first and second reflection elements 11b, 11c do not need to be different from each other. For example, they may be a short circuit 11a between the conductors of the first electrical connection 12a and a short circuit 11a between the conductors of the second electrical connection 12b, respectively.

Accordingly, a first marker time delay is associated with the first electrical connection 12a, and a second marker time delay, other than the first marker time delay, is associated with the second electrical connection 12b. In other words, the marker 9 is configured to transmit the first diagnostic radar signal 8 with a first marker time delay, and to transmit the second diagnostic radar signal 8 with a second marker time delay.

In addition, if the two reflection elements 11 are impedances with different values, the first and second diagnostic radar signals 8 may also have different amplitudes and/or phases.

This leads to two diagnostic radar signals that are regarded as different, despite having substantially the same waveform, since they are characterized by different amplitudes, phases and/or time delays, by measuring the time delay starting from reception of the first radar signal 3 by the marker 9, or equivalently starting from transmission of the first radar signal 3 by the transceiver 2.

The switch 16 may comprise, for example, any switch, preferably a solid-state switch, which is suitable, according to known design criteria, for a switching frequency that depends on the specific alternation scheme selected from the first and the second (and optionally the third) pluralities of cycles, as well as the frame rate of the radar system 1.

The presence of a switch 16 may clearly require the provision of a power supply, such that the marker 9 is no longer a fully passive element, but preferably there are still no signal amplifications acting on either the first or the second electrical signals.

Upon generation of the diagnostic radar signal 8 (or the different diagnostic radar signals in different cycles), the diagnostic radar signal 8 is collected by the transceiver 2 with all the other portions of the second radar signal 5.

During processing of the second radar signal 5, according to the invention the processing unit is configured to determine whether the second radar signal 5 contains the diagnostic radar signal 8. In the embodiments in which the diagnostic mode is periodically activated and deactivated, the check is carried out only when the mode is active, i.e. during the first plurality of cycles but not during the second plurality of cycles, or in other embodiments during the first and second pluralities of cycles, but not during the third plurality of cycles. Still alternatively, even during the cycles in which the diagnostic mode is not active, the processing unit performs processing steps corresponding to a check whether the second radar signal 5 contains the diagnostic radar signal 8, but this does not lead to indication of malfunctions, as discussed below.

For this purpose, the processing unit is configured to store a predetermined diagnostic track. Preferably, the diagnostic track is stored by processing the second radar signal 5, and in particular by selecting a portion of the detection track associated with the diagnostic radar signal 8, during one or more calibration cycles preceding the subsequent cyclic operation of the radar.

More in detail, in at least one calibration cycle the marker 9 is active (i.e. the switch 16, if any, connects the marker antenna 10 to the reflection element 11 of interest) and is already placed in the field of view 4 in the position it will maintain during the subsequent regular operation. Normal processing of the second radar signal 5, as described above, leads different portions of the second radar signal 5 to be associated with different distances from the transceiver 2 portion.

In this calibration cycle a characteristic portion of the second radar signal 5 is determined to be originated from the diagnostic radar signal 8. This characteristic portion is received by the transceiver 2 with a characteristic time delay which corresponds, according to the predetermined correspondence, to a characteristic distance Dc from the transceiver 2. The characteristic distance Dc, a characteristic signal amplitude assumed by this portion, and optionally a characteristic phase, are stored as the diagnostic track to be searched for in the subsequent cycles. The characteristic distance Dc, the characteristic signal amplitude, and the characteristic phase may also be a distribution of characteristic signal amplitudes and a distribution of characteristic phases for a range of characteristic distances, selected in the detection track of the calibration cycle.

During this calibration cycle, the selection of the correct portion may be made by an operator in charge of calibration, may be calculated beforehand based on the characteristics and position of the marker 9, or may be automatically determined by comparison of different calibration cycles. For example, the diagnostic track may be stored as the difference between the detection track generated in a calibration cycle in which the marker 9 is active, and the detection track generated during a calibration cycle in which the marker 9 is not active.

All these calibration operations can be repeated through several cycles, and the results obtained may be averaged to obtain more precise values, optionally introducing thresholds to define admissible and inadmissible deviations from the diagnostic track stored for the subsequent cycles.

With the diagnostic track stored, it is possible to check, when processing the second radar signal 5 during normal operation, whether the predetermined diagnostic track can be recognized from the second radar signal 5, i.e. whether the predetermined diagnostic track is present in the detection track. This operation implies, for example, checking whether the various portions of the second radar signal 5 include a portion located in the position of the diagnostic track, i.e. at the characteristic distance Dc, and having substantially the same amplitude as the diagnostic track, i.e. the characteristic amplitude, and optionally having a phase difference with respect to the phase of the diagnostic track, i.e. the characteristic phase, which is less than a maximum phase difference.

If they do, then the diagnostic radar signal 8 is actually present in its correct form inside the second radar signal 5, and therefore the generation of the first radar signal 3, the reception of the second radar signal 5, and their processing to generate the detection track were carried out correctly.

Otherwise, i.e. when no significant portion of the second radar signal 5 is detected for the characteristic distance Dc of the diagnostic track or when a portion whose amplitude is significantly different from the characteristic amplitude or whose phase is significantly different from the characteristic phase is detected, then not all the aforementioned conditions have occurred.

This may be the case, for example, when the first radar signal 3 is not generated, and therefore the marker 9 generates no diagnostic radar signal 8. Alternatively, this may be the case when the diagnostic radar signal 8 exists but has a frequency, an amplitude and/or a phase other than that expected due to errors in the generation or transmission of the first radar signal 3. It should be noted that in the case of frequency changes, processing of the second radar signal 5 leads to assignment of a distance other than the characteristic distance Dc to the portion of the diagnostic radar signal 8. Also, it may happen that the diagnostic radar signal 8 is correct, but malfunctions in reception or subsequent processing thereof cause the diagnostic track not to be recognizable in the detection track.

Finally, failure to find the diagnostic track in the detection track may be caused by a malfunction that does not occur in the transceiver 2 or the processing unit itself, but in the marker 9. This is of course a less critical fault condition since the targets 7 can be still detected but it is in any case important to recognize also the possibility of a failure of the diagnostic system.

In any of these scenarios, i.e. when the diagnostic track cannot be recognized in the detection track, the processing unit is configured to indicate a malfunction in the radar system 1.

Concerning the characteristic distance Dc, which is detected both in the calibration cycles and in the subsequent cycles of normal operation, it should be noted that it may or may not correspond to the actual marker distance Dm. Likewise, the amplitude and phase may also be representative of the actual size and shape of the marker 9, or may be altered, in an adjustable manner during the design stage, due to reflection on the reflection impedance 13.

Concerning the distance, this is due to the fact that, as already explained, the processing unit establishes a correspondence between time delays in the reception of the portions of the second radar signal 5 and distances of origin of the portions. Nevertheless, this correspondence is generally valid for radar signals which are reflected in a substantially instantaneous manner when they impinge upon a target 7. This does not account for the marker time delay that may occur as shown, each time the electrical connection 12 has a length sufficient to appreciably delay the propagation of the first and second electrical signals.

Therefore, in general, the characteristic distance Dc is at least equal to the marker distance Dm, and in case of non-negligible marker time delays, the characteristic distance Dc is given by the sum of the marker distance Dm and an additional distance. In particular, the marker time delay corresponds, according to the predetermined correspondence, to the additional distance.

This effect may be exploited during design, by setting the marker time delay, i.e. the length of the electrical connection 12, to optimize the characteristic distance Dc according to contingent needs. Thus, it can be obtained, for example, that a marker 9, although positioned within the casing 6, hence with a small marker distance Dm, gives rise to a characteristic portion which is interpreted by the processing unit as a dummy target 17 outside the casing 6, i.e. with a high characteristic distance Dc. In general, the characteristic distance Dc may correspond to a position that is physically external to the marker 9.

Advantageously, as shown in FIG. 3, this also allows the marker 9 to be placed possibly also within a monitored area 4a of the particularly critical field of view 4, with the diagnostic radar signal 8 not interfering with the detection of objects in such monitored area 4a, by setting the Dc characteristic distance outside the monitored area 4a.

This possibility is further improved if the radar system 1 has an angular resolution, in terms of azimuth and/or elevation. Thus, the diagnostic track may represent a dummy target 17 confined to a limited area identified not only by a particular distance value, but also by a specific azimuth and/or elevation angle. The processing unit will therefore more easily recognize the diagnostic radar signal 8 by searching for the diagnostic track at a specific position defined by the characteristic distance Dc and at least one of characteristic azimuth and/or elevation angle.

When processing is based on distance alone, this reduces problems of superimposition and interpretation of the signal, especially if a target 7 is located at the same distance from the transceiver 2 as the characteristic distance Dc of the diagnostic track, even if the target 7 is actually angularly spaced from the marker 9.

In addition, by adjusting the characteristic distance Dc with appropriate sizing of the marker 9, the marker 9 may be simply placed at the correct angle relative to the transceiver 2 to be able to originate the diagnostic track where desired in terms of both angles and distance. Thus, any interference between the diagnostic track and normal detection can be avoided. For example, the diagnostic track may be located at positions of no interest in the field of view 4, or at distances from the transceiver 2 that are not actually reachable by the first signal with a significant amplitude.

Furthermore, the effect of alteration of distance (and likewise also amplitude and/or phase) produced by the marker 9 may be used in embodiments in which different diagnostic radar signals 8 are transmitted in different pluralities of cycles. In fact, as already described, two different electrical connections inside the marker 9 can determine a first marker time delay and a second (different) marker time delay.

In this case, during several calibration cycles, a first diagnostic track and a second diagnostic track are stored. The first diagnostic track is associated with a first characteristic distance Dc, given by the sum of the marker distance Dm and a first additional distance. Likewise, the second diagnostic track is associated with a second characteristic distance Dc, given by the sum of the marker distance Dm and a second additional distance, different from the first additional distance. According to the predetermined correspondence, the first additional distance corresponds to the first marker time delay, and the second additional distance corresponds to the second marker time delay.

Then, in normal operation, the processing unit is configured to check whether the first diagnostic track can be recognized by the second radar signal 5, in the first plurality of cycles, and whether the second diagnostic track can be recognized by the second radar signal 5, in the second plurality of cycles.

Therefore, the alternation of the cycles in which different electrical connections are connected to the marker antenna 10 simulates the presence of a moving dummy target 17, because the first and second diagnostic radar signals 8 have distinct delays that are interpreted during processing as different distances from the transceiver 2. This facilitates recognition of the diagnostic radar signals as portions of the second radar signal 5.

In one embodiment, the radar system 1 comprises moving means (not shown) configured to move the marker 9, and in particular at least the marker antenna 10. The moving means may be configured to impart a continuous motion to the marker antenna 10, for example a rotary motion. Alternatively, the moving means may be configured to move the marker antenna 10, in different cycles between a position in which the marker antenna 10 is shielded from the first radar signal 3 (possibly by being outside the field of view 4) and a position in which the marker antenna 10 receives the first radar signal 3 and transmits the diagnostic radar signal 8.

This embodiment may further facilitate the recognition of the diagnostic track or the activation of the diagnostic mode in a limited number of detection cycles without interfering with the others.

The diagnostic method for the radar system 1 will be now described. It will be appreciated that the steps of the method substantially correspond to what has already been described concerning signal exchanges and processing of the radar system 1. The same considerations will apply. Furthermore, all the processing operations and signal exchanges as described above may form steps of the method even where not expressly indicated below.

The method first comprises placing the marker 9 in the field of view 4 of the radar system 1, inside or outside the casing 6 that contains the transceiver 2.

Then, the method includes storing a predetermined diagnostic track, preferably during one or more calibration cycles, or by introducing a predetermined diagnostic track, pre-calculated according to theoretical models, into the processing unit. Depending on the embodiments, a first and a second diagnostic tracks may be stored.

An additional step consists in transmitting a first radar signal 3 into the field of view 4 by a transceiver 2.

The first radar signal 3 is received by the marker 9, namely by a marker antenna 10. A diagnostic radar signal 8 is retransmitted by the marker 9 to the transceiver 2.

The diagnostic radar signal 8 is obtained as a function of the first radar signal 3, for example through the steps of converting the first radar signal 3 into a first electrical signal in the marker 9, reflecting the first electrical signal and generating a second electrical signal in the marker 9, and converting the second electrical signal into a radar signal.

In certain embodiments, the first electrical signal is brought, in distinct pluralities of cycles, to distinct reflection elements 11b, 11c, or selectively to one reflection element 11 and to one absorption impedance 14, to thereby generate different diagnostic radar signals 8 or to alternate cycles in which the diagnostic radar signal 8 is transmitted with cycles in which it is not transmitted.

Then, the method comprises receiving, by the transceiver 2, a second radar signal 5 from the field of view 4, a portion whereof is given by the diagnostic radar signal 8.

This is followed by the step of processing the second radar signal 5, to thereby generate a detection track and detect the presence of targets 7 in the field of view 4 from the detection track.

Finally, in the cycles in which the diagnostic mode is active, processing the second radar signal 5 comprises checking whether the predetermined diagnostic track is present in the detection track, to thereby determine whether the second radar signal 5 contains the diagnostic radar signal 8. If it is not present, a malfunction in radar system 1 is indicated.

A skilled person may obviously envisage a number of equivalent changes to the above discussed variants, without departure from the scope defined by the appended claims.

The invention claimed is:

1. A radar system, comprising:
   a transceiver configured to cyclically transmit a first radar signal into a field of view and to cyclically receive a second radar signal from the field of view;
   a processing unit configured to cyclically process the second radar signal, to thereby generate a detection track, given by a signal amplitude distribution as a function of distance from the transceiver, and to detect presence of targets in the field of view from the generated detection track; and
   a marker located in the field of view, wherein the marker is arranged in a fixed position relative to the transceiver and wherein the marker is configured to receive the first radar signal and to transmit a diagnostic radar signal toward the transceiver as a function of the first radar signal;
   wherein the processing unit is further configured to:
   store, before a current detection cycle, a predetermined diagnostic track, including at least a characteristic distance from the transceiver and a characteristic signal amplitude,
   check, when processing the second radar signal for the current detection cycle, whether the detection track includes a track portion in which a signal amplitude equal to the characteristic signal amplitude is assigned to the characteristic distance,
   recognize the track portion, if present, as the predetermined diagnostic track,
   determine, based on this check, whether the second radar signal contains the diagnostic radar signal, and
   report a malfunction in the radar system in case the diagnostic radar signal is not contained in the second radar signal.

2. The radar system of claim 1, wherein the marker comprises:

at least one marker antenna configured to receive the first radar signal and to convert the received first radar signal into a first electrical signal within the marker; and a reflecting element configured to reflect the first electrical signal, thereby generating a second electrical signal within the marker, the reflecting element comprising a short circuit, an open circuit, or an electrical reflection impedance;

wherein the at least one marker antenna is further configured to transmit the diagnostic radar signal by converting the second electrical signal into a radar signal.

3. The radar system of claim 1, wherein:

the processing unit is further configured, when processing the second radar signal, to establish a predetermined correspondence between time delays, occurring between transmission of the first radar signal and reception of portions of the second radar signal, and origin distances of the portions of the second radar signal from the transceiver, the marker is placed at a marker distance from the transceiver, the transceiver is further configured to receive the diagnostic radar signal as a portion of the second radar signal, having a characteristic time delay that corresponds, according to the predetermined correspondence, to the characteristic distance, which is given by a sum of the marker distance and an additional distance, and the marker is further configured to transmit the diagnostic radar signal with a marker time delay from reception of the first radar signal, the marker timer delay corresponding, according to the predetermined correspondence, to the additional distance.

4. The radar system of claim 3, wherein the marker comprises:

at least one marker antenna configured to receive the first radar signal and to convert the received first radar signal into a first electrical signal within the marker;

a reflecting element configured to reflect the first electrical signal, thereby generating a second electrical signal within the marker, the reflecting element comprising a short circuit, an open circuit, or an electrical reflection impedance; and an electrical connection between the at least one marker antenna and the reflecting element, wherein the marker time delay is given by a time required for the first electrical signal to propagate in the electrical connection from the at least one marker antenna to the reflecting element and for the second electrical signal to propagate in the electrical connection from the reflecting element to the at least one marker antenna;

wherein the at least one marker antenna is further configured to transmit the diagnostic radar signal by converting the second electrical signal into a radar signal.

5. The radar system of claim 1, wherein:

the marker is further configured to transmit the diagnostic radar signal in a first plurality of cycles and to transmit no diagnostic radar signal in a second plurality of cycles, and the processing unit is further configured to determine whether the second radar signal contains the diagnostic radar signal only in the first plurality of cycles.

6. The radar system of claim 5, wherein the marker comprises:

at least one marker antenna configured to receive the first radar signal and to convert the received first radar signal into a first electrical signal within the marker;

a reflecting element configured to reflect the first electrical signal, thereby generating a second electrical signal within the marker, the reflecting element comprising a short circuit, an open circuit, or an electrical reflection impedance;

an electrical absorption impedance configured to receive the first electrical signal without reflecting the second electrical signal; and a switch configured to selectively connect the at least one marker antenna to the reflecting element during the first plurality of cycles and to the electrical absorption impedance during the second plurality of cycles;

wherein the at least one marker antenna is further configured to transmit the diagnostic radar signal by converting the second electrical signal into a radar signal.

7. The radar system of claim 1, wherein:

the marker is further configured to transmit a first diagnostic radar signal in a first plurality of cycles and to transmit a second diagnostic radar signal in a second plurality of cycles, and the processing unit is further configured to store a predetermined first diagnostic track and a predetermined second diagnostic track, to check whether the predetermined first diagnostic track is present in the detection track in the first plurality of cycles, and to check whether the predetermined second diagnostic track is present in the detection track in the second plurality of cycles.

8. The radar system of claim 7, wherein the marker comprises:

at least one marker antenna configured to receive the first radar signal and to convert the received first radar signal into a first electrical signal within the marker;

a reflecting element configured to reflect the first electrical signal, thereby generating a second electrical signal within the marker, the reflecting element comprising a short circuit, an open circuit, or an electrical reflection impedance;

a first reflecting element and a second reflecting element differing from the first reflecting element; and a switch configured to selectively connect the at least one marker antenna to the first reflecting element during the first plurality of cycles and to the second reflecting element during the second plurality of cycles;

wherein the at least one marker antenna is further configured to transmit the diagnostic radar signal by converting the second electrical signal into a radar signal.

9. The radar system of claim 7, wherein:

the processing unit is further configured, when processing the second radar signal, to establish a predetermined correspondence between time delays, occurring between transmission of the first radar signal and reception of portions of the second radar signal, and origin distances of the portions of the second radar signal from the transceiver, the marker is placed at a marker distance from the transceiver, the transceiver is further configured to receive the diagnostic radar signal as a portion of the second radar signal, having a characteristic time delay that corresponds, according to the predetermined correspondence, to the characteristic distance, which is given by a sum of the marker distance and an additional distance, the marker is further configured to transmit the diagnostic radar signal with a marker time delay from reception of the first radar signal, the marker timer delay corresponding, according to the predetermined correspondence, to the additional distance, the marker comprises a first reflecting element, a first electrical connection between at least one marker antenna of the marker and the first reflecting element, a second reflecting element, a second electrical connection between the at least one marker antenna and the second reflecting element, and a switch configured to selectively connect the at least one marker antenna to the first reflecting element via the first electric connection during the first plurality of cycles and to the second reflecting element via the second electric connection during the second plurality of cycles, and the predetermined first diagnostic track is associated with a first additional distance, which corresponds, according to h predetermined correspondence, to a first marker time delay associated with the first electrical connection, and the predetermined second diagnostic track is associated with a second additional distance, which differs from the first additional distance and corresponds, according to the predetermined correspondence, to a second marker time delay associated with the second electrical connection.

10. The radar system of claim 1, further comprising:
a casing that contains the transceiver;
wherein the marker is arranged inside the casing, or
wherein the marker is arranged outside the casing, spaced from the casing.

11. The radar system of claim 1, wherein the processing unit is further configured to store the predetermined diagnostic track by processing the diagnostic radar signal received by the transceiver during one or more calibration cycles.

12. A diagnostic method for a radar system, the method comprising:
placing a marker in a field of view of a transceiver of the radar system, in a fixed position relative to the transceiver;
storing, before a current detection cycle, a predetermined diagnostic track, including at least a characteristic distance from the transceiver and a characteristic signal amplitude;
cyclically transmitting a first radar signal into the field of view by the transceiver;
cyclically receiving, by the marker, the first radar signal, and cyclically transmitting, by the marker, a diagnostic radar signal as a function of the first radar signal, toward the transceiver;
cyclically receiving, by the transceiver, a second radar signal from the field of view;
cyclically processing the second radar signal, to thereby generate a detection track, given by a signal amplitude distribution as a function of distance from the transceiver, and to detect presence of targets in the field of view from the detection track;
checking, when processing the second radar signal for the current detection cycle, whether the detection track includes a track portion in which a signal amplitude equal to the characteristic signal amplitude is assigned to the characteristic distance;
recognizing the track portion, if present, as the predetermined diagnostic track;
determining, based on this checking, whether the second radar signal contains the diagnostic radar signal; and
reporting a malfunction in the radar system in case the diagnostic radar signal is not contained in the second radar signal.

13. The radar system of claim 1, wherein the marker comprises:
at least one marker antenna configured to receive the first radar signal and to convert the received first radar signal into a first electrical signal within the marker; and
a reflecting element configured to reflect the first electrical signal, thereby generating a second electrical signal within the marker;
wherein the at least one marker antenna is further configured to transmit the diagnostic radar signal by converting the second electrical signal into a radar signal.

14. The radar system of claim 3, wherein the marker comprises:
at least one marker antenna configured to receive the first radar signal and to convert the received first radar signal into a first electrical signal within the marker;
a reflecting element configured to reflect the first electrical signal, thereby generating a second electrical signal within the marker; and
an electrical connection between the at least one marker antenna and the reflecting element, wherein the marker time delay is given by a time required for the first electrical signal to propagate in the electrical connection from the at least one marker antenna to the reflecting element and for the second electrical signal to propagate in the electrical connection from the reflecting element to the at least one marker antenna;
wherein the at least one marker antenna is further configured to transmit the diagnostic radar signal by converting the second electrical signal into a radar signal.

15. The radar system of claim 5, wherein the marker comprises:
at least one marker antenna configured to receive the first radar signal and to convert the received first radar signal into a first electrical signal within the marker;
a reflecting element configured to reflect the first electrical signal, thereby generating a second electrical signal within the marker;
an electrical absorption impedance configured to receive the first electrical signal without reflecting the second electrical signal; and
a switch configured to selectively connect the at least one marker antenna to the reflecting element during the first plurality of cycles and to the electrical absorption impedance during the second plurality of cycles;
wherein the at least one marker antenna is further configured to transmit the diagnostic radar signal by converting the second electrical signal into a radar signal.

16. The radar system of claim 7, wherein the marker comprises:
at least one marker antenna configured to receive the first radar signal and to convert the received first radar signal into a first electrical signal within the marker;
a reflecting element configured to reflect the first electrical signal, thereby generating a second electrical signal within the marker;
a first reflecting element and a second reflecting element differing from the first reflecting element; and
a switch configured to selectively connect the at least one marker antenna to the first reflecting element during the first plurality of cycles and to the second reflecting element during the second plurality of cycles;

wherein the at least one marker antenna is further configured to transmit the diagnostic radar signal by converting the second electrical signal into a radar signal.

17. A radar system, comprising:
- a transceiver configured to cyclically transmit a first radar signal into a field of view and to cyclically receive a second radar signal from the field of view;
- a processing unit configured to cyclically process the second radar signal, to thereby generate a detection track, given by a signal amplitude distribution as a function of distance from the transceiver, and to detect presence of targets in the field of view from the generated detection track; and
- a marker located in a fixed position of the field of view of the transceiver, wherein the marker is configured to receive the first radar signal and to transmit a diagnostic radar signal toward the transceiver as a function of the first radar signal;

wherein the processing unit is further configured to:
- store, before a current detection cycle, a predetermined diagnostic track, including at least a characteristic distance from the transceiver and a characteristic signal amplitude,
- check, when processing the second radar signal for the current detection cycle, whether the detection track includes a track portion in which a signal amplitude equal to the characteristic signal amplitude is assigned to the characteristic distance,
- recognize the track portion, if present, as the predetermined diagnostic track,
- determine, based on this check, whether the second radar signal contains the diagnostic radar signal, and
- report a malfunction in the radar system in case the diagnostic radar signal is not contained in the second radar signal, wherein the marker is further configured to transmit a first diagnostic radar signal in a first plurality of cycles and to transmit a second diagnostic radar signal in a second plurality of cycles, wherein the processing unit is further configured to store a predetermined first diagnostic track and a predetermined second diagnostic track, to check whether the predetermined first diagnostic track is present in the detection track in the first plurality of cycles, and to check whether the predetermined second diagnostic track is present in the detection track in the second plurality of cycles, wherein the processing unit is further configured, when processing the second radar signal, to establish a predetermined correspondence between time delays, occurring between transmission of the first radar signal and reception of portions of the second radar signal, and origin distances of the portions of the second radar signal from the transceiver, wherein the marker is placed at a marker distance from the transceiver, wherein the transceiver is further configured to receive the diagnostic radar signal as a portion of the second radar signal, having a characteristic time delay that corresponds, according to the predetermined correspondence, to the characteristic distance, which is given by a sum of the marker distance and an additional distance, wherein the marker is further configured to transmit the diagnostic radar signal with a marker time delay from reception of the first radar signal, the marker timer delay corresponding, according to the predetermined correspondence, to the additional distance, wherein the marker comprises a first reflecting element, a first electrical connection between at least one marker antenna of the marker and the first reflecting element, a second reflecting element, a second electrical connection between the at least one marker antenna and the second reflecting element, and a switch configured to selectively connect the at least one marker antenna to the first reflecting element via the first electric connection during the first plurality of cycles and to the second reflecting element via the second electric connection during the second plurality of cycles, and wherein the predetermined first diagnostic track is associated with a first additional distance, which corresponds, according to the predetermined correspondence, to a first marker time delay associated with the first electrical connection, and the predetermined second diagnostic track is associated with a second additional distance, which differs from the first additional distance and corresponds, according to the predetermined correspondence, to a second marker time delay associated with the second electrical connection.

* * * * *